US005763338A

United States Patent [19]

Sean

[11] Patent Number: 5,763,338

[45] Date of Patent: Jun. 9, 1998

[54] HIGH LEVEL LOADING OF BORATE INTO LIGNOCELLULOSIC-BASED COMPOSITES

[75] Inventor: Sy Trek Sean, Quebec, Canada

[73] Assignee: Forintek Canada Corporation, Vancouver, Canada

[21] Appl. No.: 620,935

[22] Filed: Mar. 22, 1996

[51] Int. Cl.$^6$ .................................................. C09K 3/18

[52] U.S. Cl. ......................... 442/413; 106/18.3; 264/109; 428/511; 428/537.1; 442/417

[58] Field of Search .................................... 264/109, 122; 106/18.3; 442/413, 417; 428/511, 537.1

[56] References Cited

U.S. PATENT DOCUMENTS

| | | |
|---|---|---|
| 4,879,083 | 11/1989 | Knudson et al. . |
| 5,246,652 | 9/1993 | Hsu et al. . |

OTHER PUBLICATIONS

Laks, P.E., B.A. Haataja, R.D. Palardy and R.J. Bianchini. 1988. Evaluation of ahesives for bonding borate–treated flakeboards. Forest Prod. J. 38 (11/12): 23–24.

Laks, P.E. and R.D. Palardy. 1990. The development of borate–containing flakeboard. In: Proc. 47355, First Inter. Conf. on Wood Protection with Diffusable Preservatives. Forest Prod. Res. Soc., Madison, Wis.

Knudson, R.M. 1990. Commercial development of borax––treated wood composites. In: Proc. 47355, First Inter. Conf. on Wood Protection with Diffusable Preservatives. Forest. Prod. Res. Soc., Madison, Wis.

Hsu, E. and F. Praff. 1992. Methods of making PF–bonded waferboard containing water soluble borates and boric acid. Presented at: Adhesive Technology for Tropical Woods Symposium, Taipei, Taiwan.

Hashim, R., D.J. Dickinson, R.J. Murphy and J.M. Dinwoodie. 1992. Effect of vapour boron treatment on mechanical properties of wood based board materials. International Research Group on Wood Preservation., Document IRG/WP/3727–92.

Turner, P., R.J. Murphy and D.J. Dickinson. 1990. Treatment of wood based panel products with volatile borates. The Inter. Res. Group on Wood Pres. Document No. IRG/WP/3616.

Schmidt, E.L., H.J. Hall, R.O. Gertjejansen, C.G. Carll and R.C. DeGroot. 1983. Biodeterioration and strength reductions in preservative treated aspen waferboard. Forest Prod. J. 33 (11/12): 45–53.

Laks, P.E. and M.J. Manning. Inorganic borates as preservative systems for wood composites. Michigan Technological University, Houghton, Michigan, U.S. Borax, Valencia, California.

Yao, Y., M. Yoshioka and N. Shiraishi. 1995. Rigid Polyurethane foams from combined liquefication mixtures of wood and starch.

*Primary Examiner*—James J. Bell
*Attorney, Agent, or Firm*—Barnes & Thornburg

[57] ABSTRACT

Although borates have been recognized as desirable for use in wood-based articles because of their preservative properties and low toxicity, it has not until now been possible to make effective use of them. A lignocellulosic e.g. wood-based composite article in accordance with the present Invention includes a low solubility borate compound which is mixed with the lignocellulosic furnish, resin adhesive, and a flow agent, the resultant mixture being pressed into a mat and cured. The low solubility borate can be used in a quantity from about 1% to 10% by weight of the furnish. Suitable flow agents are polyethylene glycol and glycerol in the amount of 0.4% to about 4% by weight of the furnish.

13 Claims, No Drawings

HIGH LEVEL LOADING OF BORATE INTO LIGNOCELLULOSIC-BASED COMPOSITES

BACKGROUND OF THE INVENTION a) Field of the Invention

The present invention relates to a simple method for incorporating high level loading of borates to improve the durability of thus treated wood-based or any lignocellulosic composite products such as panels. More specifically it relates to the use of low solubility borate compounds as a wood preservative to make treated products more resistant to mould, decay, insects and fire.

b) Description of the Prior Art

Wood-based materials including oriented strand board (OSB) are being used in environments where they may be exposed to physical or biological agents of deterioration, e.g. fire, mould, decay and insects. There is a need for wood composite products that have improved properties and performance to meet customer needs and to compete with other materials.

The use of traditional wood preservatives, e.g. chromated copper arsenate, creosote and pentachlorophenol, in wood composites has been limited due to their adverse effect on the mechanical properties of the treated panels and to the general need for an environment friendly treatment.

The benefits of using borate compounds as a wood preservative against a variety of insects and decay has been known for some time. Borates are considered to have minimal environmental impact and low mammalian toxicity. In fact it has been used as an antiseptic. Furthermore, borates also impart some fire resistance properties to wood and wood products, which could be an important added benefit to the treated products. The successful utilization of borates as a panel preservative could conceivably open many new markets for the wood composite industry.

Several disadvantages of using borates as wood preservative have been observed. The most critical one is related to their adverse effect on the mechanical properties of treated wood panels. Over the past few years attempts to minimize the detrimental effects of borate compounds on the panels have been unsuccessful.

For example, Laks et al. (as described in an unpublished report of Michigan Tech. University, Houghton, Mich.) in 1992 applied sodium borate (Tim-Bor™) in aqueous solutions to aspen flakes at loading levels of 0.5 and 5.0 percent by weight in producing composite boards. In spite of using adhesive levels of 6 to 7 percent phenol formaldehyde (three times normal levels), the internal bond (IB) strength of the boards produced was much lower than that of control boards. With 5 percent borate content there was a significant reduction in bending strength and a large increase in thickness swelling. The addition of 5 percent sodium borate in an aqueous solution was also tried at the Alberta Research Council (ARC) as a fire retardant; the treatment produced a substantial improvement in the fire resistance properties; however, mechanical properties were very poor.

Knudson et al. in U.S. Pat. No. 4,879,083 issued Nov. 1989 found that a small amount of low solubility borate, less than 1 percent, can be incorporated into panel without a noticeable reduction of the mechanical properties of the panel. But, they also recognized that the strength of waferboard was reduced significantly to an unacceptable level when higher levels of soluble borates were added into panel.

Other research has shown that even at 1% zinc borate, the waferboard properties particularly IB strength were substantially reduced.

Hsu et al. in U.S. Pat. No. 5,246,65, issue Sep. 1993, proposed use of a resin that does not react readily with borates, such as a "two-stage" (novolac) phenol-formaldehyde (PF) resin, as opposed to the typical "one-stage" (resole) PF used in OSB production. They also proposed the use of severe pressing conditions that would promote resin flow and normal curing. This was achieved by using the direct injection of pressurized steam, preferably utilizing a self-sealing or sealed steam press, as opposed to the conventional press method.

SUMMARY OF THE INVENTION

The object of the present invention is to overcome the above drawbacks and provide a wood or any lignocellulosic-based composite product incorporating borate preservative, while maintaining adequate mechanical properties in the product.

The invention provides a method for the production of a lignocellulosic-based composite article that includes a low solubility borate compound in an amount sufficient to provide improved resistance to insect termite and biological attack, said method comprising: mixing a lignocellulosic furnish with a binder, a low solubility borate compound, and at least one flow agent, forming the resultant mixture into a mat; and pressing and heating said mat to an extent sufficient to cure said binder and form said wood composite article.

The furnish employed will frequently be wood, but many other lignocellulosic materials can also be used e.g. bagasse-, straw- and bamboo-based products.

The binder is preferably a resin adhesive such as urea-formaldehyde resin, isocyanate, phenol-formaldehyde resin or phenol-resorcinol formaldehyde resin.

Unless a flow agent is used, it is virtually impossible to use zinc borate in amounts over 1% by weight to produce OSB/waferboard without a very significant reduction of mechanical properties. However the use of a flow agent enables zinc borate to be incorporated in an amount which will be sufficient not only to enhance decay resistance, but also termite and fire resistance. Furthermore, this can be done without significantly impairing the mechanical properties of the product, but in fact in some cases with enhancement of these properties. A borate content of 1% or more is sufficient to provide resistance to fungus or insects; a borate content of at least 5% is required to provide fire resistance.

As used herein the expression "low solubility borate" is defined as a borate compound of which the solubility in water at 24° C. is less than 10%. Zinc borate has a solubility that is less than 0.3%; anhydrous borax has a solubility of 4.9%.

A "soluble borate" is herein defined as a borate compound having a solubility in water at 24° C. that is higher than 10%. By this definition most sodium borates are soluble borates.

As used herein the expression "flow agent" is defined as a substance that can minimize the interaction between resin and borate compounds and can promote the flow of resin and borates during hot pressing. Any substance used for the above purpose can be considered as a flow agent, e.g. polyethyleneglycol, glycerol. The inventor's studies have shown that only organic compounds containing hydroxyl(—OH) groups, including flow agent effective sugars such as mannitol, can be used to minimize interaction between the borate and the resin. Thus although wax (which contains no –OH group) is normally employed to promote resin flow during pressing of composite boards, its efficacy is drastically reduced when borate is added to the mixture, so that wax is not regarded as a "flow agent" within the ambit of the present invention.

The wax that is normally included in mixtures prepared for the manufacture of wood composite articles can be replaced by including a corresponding additional amount of the flow agent. However since this is an expensive expedient, the normal quantity of wax, typically about 1½% by weight, is preferably included.

This present invention is based on the recognition that the reduction in mechanical properties of borate-treated panels is mainly related to the gelling reaction between the resin molecules and borate ions. Such interactions significantly increase the resin viscosity before it is able to flow and develop an effective bond. Also, a reduction in mechanical properties of prior art borate-treated panels is a function of borate content, e.g., reduction in mechanical properties observed in panels containing higher levels of borates is more significant than those containing lower levels.

This invention provides a simple and efficient process for making wood composites with improved resistance to biological attack and fire, using low solubility borate compounds such as zinc borate, copper borate, or anhydrous borax, the advantage being that the present invention is compatible with existing resin and plant technology as used in making wood composites. Furthermore low solubility borates are resistant to being leached out from the product in use.

Contrary to prior findings and the teaching of Knudson et al., in which the addition of borate compounds is limited to a very low retention, up to 1 percent, the present invention provides a possibility of incorporating a range of borate contents, from very low to high levels of treatment.

Contrary to prior the finding and teaching of Hsu, et al., which requires a special resin and/or technology, the present invention is suitable to use with any commercial PF resin and does not require steam injection pressing or severe pressing conditions to consolidate the panels.

In accordance with the foregoing, this invention has advantages compared to the findings and teaching of Knudson et al. and Hsu et al. The invention provides a simple method of producing borate-treated PF bonded panels with a wide range of treatment levels by utilizing existing equipment and technology in wood composite plant.

DESCRIPTION OF THE PREFERRED EMBODIMENTS

The invention will further be described by way of example only, in relation to the following examples.

Example 1

To prepare experimental panels, wood strands were dried to a target moisture content of 3 percent. The strands were placed into a drum-type laboratory blender, where 1.5 percent of hot wax (ESSO, ESSO #778), based on ovendry weight, was sprayed onto the furnish followed by the addition of 2.5 percent phenolic adhesive. Following ten minutes of blending, 0.4 percent of polyethyleneglycol (PEG 400) was sprayed onto the furnish and 1 percent of zinc borate (Borogard$^{R}$ZB) was added onto the strands which were allowed a further 10 minutes to complete the blending. Mats were hand-felted onto caul plates and hot pressed, at 215° C. for 4.5 minutes. Results are presented at the fourth line in Table 1.

Example 2

The procedure of example 1 was followed substantially as set forth therein except that 1 percent of PEG 400 was used and 2.5 percent of zinc borate was added. Results are presented at the third line in Table 1.

Example 3

The procedure of example 1 was followed substantially as set forth therein except that 3 percent of resin was added, 2 percent of PEG 400 was added and 5 percent of zinc borate was added. Results are presented at the second line in Table 1.

Example 4

The procedure of example 1 was followed substantially as set forth therein except that 3.5 percent of resin was added, 4 percent of PEG 400 was added and 10 percent of zinc borate was added. Results are presented at the first line in Table 1.

TABLE 1

Effect of Borogard$^{R}$ZB on the Wet Strength of Treated Panels

| Resin (%) | Borogard$^{R}$ZB (%) | Polyglycol (%) | IB MPa | MOR MPa | MOE MPa | MOR* MPa |
|---|---|---|---|---|---|---|
| 3.5 | 10 | 4 | 0.53 | 28.2 | 3956 | 11.13 |
| 3 | 5 | 2 | 0.5 | 27.3 | 3775 | 11.47 |
| 2.5 | 2.5 | 1 | 0.41 | 23.6 | 3350 | 11.8 |
| 2.5 | 1 | 0.4 | 0.55 | 25.2 | 3560 | 9.47 |
| 2.5 | Control | | 0.55 | 30.4 | 4220 | 14 |
| | CSA Requirement | | 0.345 | 17.2 | 3100 | 8.6 |

*Two-hour-boil Test

The properties IB (internal bond strength), MOR (modulus of rupture in bending), MOE (modulus of elasticity in bending) and MOR* (modulus of rupture in bending, two hour boil test) were tested in accordance with the standard CSA CAN3-0437.1-M85.

From Table 1 it will be seen that as compared with the control panel identified at line 5 and including no borate or polyethyleneglycol, the mechanical properties IB, MOR, MOE and MOR* of Examples 1, 2, 3 and 4 are not significantly impaired and in all cases remain well above the CSA requirement as listed in line 6.

The binder used in the above examples can be virtually any type of commercial resin adhesive, preferably a member of the phenol containing class of resins, such as phenol-formaldehyde (PF), phenol resorcinol formaldehyde (PRF), or diphenylmethane diisocyanate (MDI).

Various waxes can be employed, but waxes such as ESSO, ESSO #778 which are solid at or near room temperatures must be applied in molten form. Suitable liquid waxes are Hercules Paracol 800 (Trademark) and NarJohn Norwax 500 (Tademark).

I claim:

1. A method for the production of a lignocellulosic-based composite article that includes a low solubility borate compound in an amount sufficient to provide improved resistance to insect termite and biological attack, said method comprising:

mixing a lignocellulosic furnish with a binder, a low solubility borate compound, and at least one organic flow agent containing hydroxyl (–OH) groups;

forming the resultant mixture into a mat; and pressing and heating said mat to an extent sufficient to cure said binder and form said wood composite article.

2. The method as set forth in claim 1 wherein said binder is a resin adhesive.

3. The method as set forth in claim 1 wherein one said flow agent is selected from the group polyethyleneglycol and glycerol, and is added in an amount from about 0.4% to about 4% by weight of the furnish.

4. The method as set forth in claim 1 wherein said low solubility borate is present in a quantity from about 1% to about 10% by weight of the furnish.

5. The method as set forth in claim 4 wherein said low solubility borate is selected from the group zinc borate and anhydrous borax.

6. The method as set forth in claim 1 wherein the flow agent is added in an amount from about 0.4% to about 4% by weight of the furnish and the low solubility borate is present in a quantity from about 1% to about 10% by weight of the furnish.

7. The method as set forth in claim 6 wherein the content of flow agent is about 40% by weight of the content of the low solubility borate.

8. The method as set forth in claim 6 wherein the low solubility borate Is present in a quantity of at least about 5%.

9. A lignocellulosic composite article fabricated from a mixture comprising a lignocellulosic furnish, a phenolic resin adhesive, a low solubility borate compound and an organic flow agent containing hydroxy (–OH) groups, said mixture being formed into a mat and pressed and heated to an extent sufficient to cure said resin adhesive.

10. An article as set forth in claim 9 comprising an oriented strand board panel.

11. An article as claimed in claim 9 wherein the low solubility borate compound is present in an amount of from about 1% to about 10% by weight of the furnish and the flow agent is present in an amount from about 0.4% to about 4% by weight of the furnish.

12. An article as claimed in claim 11 wherein the low solubility borate compound is present in an amount of at least about 5% by weight of the furnish.

13. An article as claimed in claim 9 wherein said furnish is a wood furnish.

* * * * *